Dec. 31, 1963  R. LE BARON BOWEN, JR  3,115,769
VISCOMETER SPINDLE
Filed Oct. 10, 1962
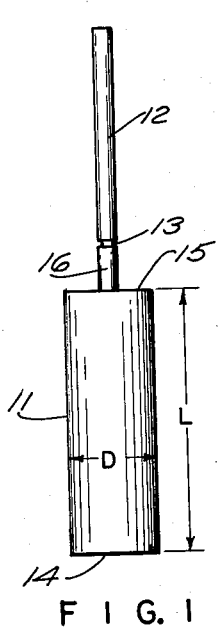
FIG. 1
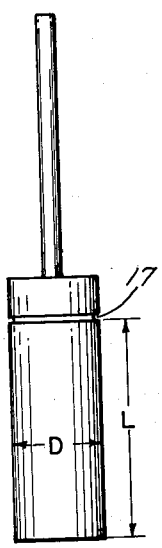
FIG. 2
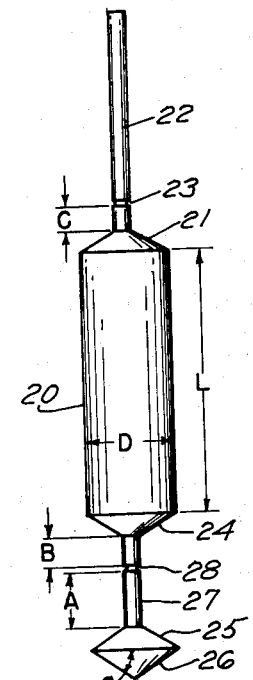
FIG. 3
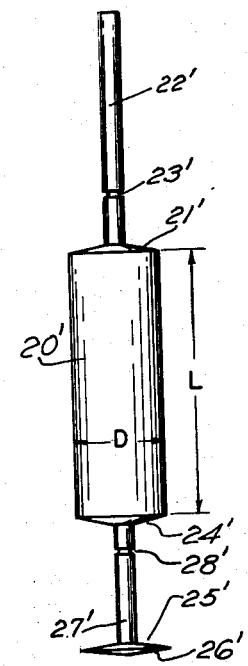
FIG. 4
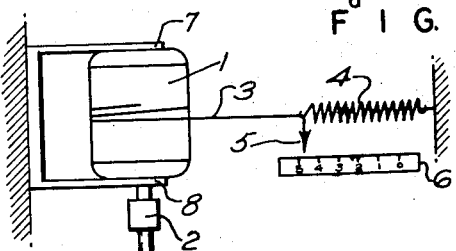
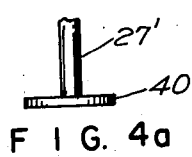
FIG. 4a
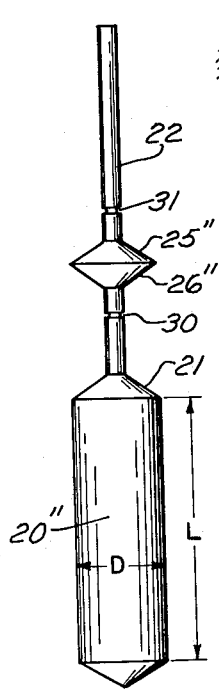
FIG. 5
FIG. 7
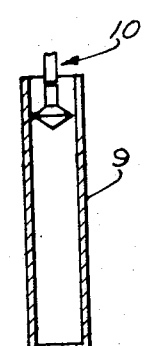
FIG. 8
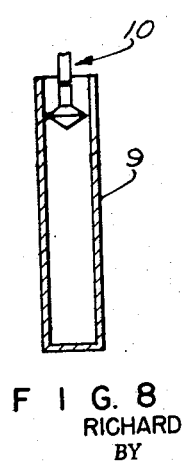
FIG. 6
INVENTOR.
RICHARD LeBARON BOWEN, JR
BY
*Barlow & Barlow*
ATTORNEYS

United States Patent Office 3,115,769
Patented Dec. 31, 1963

3,115,769
VISCOMETER SPINDLE
Richard Le Baron Bowen, Jr., 35 Fessenden Road,
Barrington, R.I.
Filed Oct. 10, 1962, Ser. No. 229,545
8 Claims. (Cl. 73—59)

The present invention relates to viscometers, and more particularly to rotational viscometers. Specifically, the invention relates to rotational viscometers wherein a cylindrical spindle is immersed in a large enough body of fluid so that the walls of the container do not effect the drag on the spindle and do not cause the instrument to act like a coaxial viscometer although the spindle could be used in a coaxial viscometer. More specifically, the invention relates to spindles which can be used to obtain rational measurements on non-Newtonian fluids.

Cylindrical spindles have been used in the past for measuring the viscosity of non-Newtonian fluids. The viscosity is equivalent to the shear-stress divided by the shear-rate. The shear-stress at the surface of a cylinder is simply $$\frac{2T}{\pi D^2 L}$$

where T is the torque measured by the instrument, D is the cylinder diameter, and L is the length of the cylinder. However, a cylinder has, in addition to its wetted cylindrical surface, a lower end surface of full diameter D and a top end surface having a shaft protruding therefrom. Previously, it has been customary to calibrate such a spindle in a Newtonian fluid of known viscosity (such as those supplied by the National Bureau of Standards). From this an "equivalent length," $L_e$ can be calculated for the area corresponding to the ends, and this area can be added to the actual length of the cylinder to obtain an instrument constant, $L+L_e$. For use with other Newtonian fluids this would be rigorously correct. However, by definition, the shear-stress of a non-Newtonian fluid is not proportional to the shear-rate. Therefore, different shear-rates (and thus shear-stresses) would exist over the surface of the ends, and these would not be equal to the shear-rate existing at the surface of the cylinder. If the diameter of the cylinder is small in comparison to its length, the error introduced by this approximation would not be great. However, this procedure is not rigorously correct from a scientific point of view.

It is, therefore, a primary object of this invention to provide a spindle for a viscometer of the class described wherein rational measurements can be obtained with non-Newtonian fluids in a rigorously scientific manner.

It is a more specific object of the invention to provide a spindle wherein a correction for the effect of the ends can be actually measured in the fluid.

Also an object of the invention is the provision of a spindle for measurement viscosity which is simple to use and clean.

Additional objects and advantages will become apparent in the following description and claims.

FIG. 1 is a side elevation of a conventional cylindrical spindle of a type previously known;

FIG. 2 is a side elevation of another type of conventional cylindrical spindle previously known;

FIG. 3 is a side elevation of the preferred embodiment of the present invention showing a corrective element which is equivalent to the effects of the ends of the cylinder;

FIG. 4 is a side elevation of a modification of the spindle shown in FIG. 3;

FIG. 4a is a detached side elevation of a slight modification of the spindle shown in FIG. 4;

FIG. 5 is a side elevation of a further modification of the spindle shown in FIG. 3;

FIG. 6 is a side elevation of a still further modification;

FIG. 7 is a diagrammatic view of a typical viscometer; and

FIG. 8 is an elevational view partly in section of a coaxial viscometer.

Referring first to FIG. 7 we see a schematic representation of a rotational viscometer. A motor 1 has its housing mounted in suitable bearings 7, 8 and has an output coupling 2 for mounting the viscometer spindles generally indicated by reference character 10. Motor 1 is held from rotation by wire 3 fixed to the motor at one end and at the other end to spring 4 which is fixed to a stationary point at its other end. A pointer 5 is fixed to one end of the spring so that the expansion of the spring due to the motor torque can be measured on scale 6. In operation spindle 10 is immersed in the fluid to be measured. Rotation of the coupling 2 by energizing the motor produces an opposite and equal reaction on the wire 3 and spring 4. Calibration of spring 4 enables one to calculate the absolute viscosity of the fluid. If the spindle is to be used as a coaxial viscometer, the spindle 10 is immersed in a tube 9 which holds the fluid to be measured, as shown in FIG. 8.

Referring now to FIGS. 1 and 2, these show cylindrical spindles of the type previously used in experimental work. In FIG. 1 there is a cylinder 11 with a diameter D and length L. Projecting from the top surface of the cylinder is a shaft 12 which is coaxial with cylinder 11, and which is received in the viscometer. Along shaft 12 a groove 13 is turned, or the shaft could be marked in some other manner. Groove 13 acts as a reference point so that the spindle may be immersed to the same depth at all times. In addition to the cylinder itself, there is the surface area at the bottom 14 and the surface area at the top 15 plus the area of the shaft length 16 to take into consideration. Previously these additional areas would be converted to an equivalent cylindrical length with diameter D by calibration with a Newtonian fluid. In the spindle shown in FIG. 2, the top "end" has been eliminated by placing the reference groove on the cylinder. However, such a spindle is not satisfactory, since it is difficult to hold the fluid level precisely on the mark 17, so that such a spindle does not give accurate results which can be reproduced.

FIG. 3 shows the preferred embodiment of the present invention. Here there is a right circular cylinder 20 of diameter D and length L. The top of the cylinder 20 terminates in a right circular cone 21 with a projecting shaft 22 having cut therein groove 23. At the bottom of cylinder 20 is another right circular cone 24 which is connected to a double right circular cone 25, 26 by means of shaft 27 provided with groove 28. Grooves 23 and 28 are placed so that the length A of shaft 27 equals the lengths B plus C. In this description the angles of all the cones (such as $a$ of cone 26) are identical. It will be apparent that the configuration of the double cone and shaft below groove 28 is virtually identical to the sum of the surface areas of cones 21, 24 plus the shaft surface areas between grooves 23 and 28. Actually the double cones 25, 26, which have a base diameter D, have slightly more surface area than the two conical ends cylinder 20 due to the increased area caused by the small cone at the bottom of cone 26 having an equivalent base diameter of the shaft 27. This difference is so minute that it is negligible but can be controlled by changing the base diameter of cones 25, 26.

In operation the spindle of FIG. 3 is first immersed in the fluid to the depth of groove 28 and a reading taken of the torque due to the resistance to rotation by the fluid friction. Then the spindle is immersed to the depth of groove 23 and a torque reading is made. The first reading measured at groove 28 is multiplied by two and subtracted from the total reading to give very precisely the fluid friction due only to the cylindrical length L. This enables one to calculate in a quite rigorous manner the actual shear-stress existing at the particular shear-rate (speed of rotation).

FIG. 4 shows a modification of FIG. 3 which is identical to FIG. 3 from a general geometric viewpoint. In FIG. 4 the angle $a$ of the cones, 21′, 24′, 25′ and 26′ of FIG. 3 have been reduced so that the angle approaches zero. When $a$ does equal zero, the two cones 25′ and 26′ of FIG. 4 disappear and a disk of zero thickness is obtained. From a practical point of view a very thin disk 40 (FIG. 4a) could be placed at the bottom in place of the double cones, and the thin edge of this disk would have a negligible effect on the reading.

FIG. 5 indicates a further modification of FIG. 3 wherein the double cones 25″, 26″ are located above the cylindrical section 20″, so that the reading obtained by immersion to groove 30 would be subtracted from the total reading at mark 31, and this difference would then be subtracted from the initial reading to obtain the reading for the cylindrical length L. This means of measurement would be less accurate than that obtained with FIG. 3, since the reading of the double cones is obtained by a difference of two larger readings.

It will be seen that by the above constructions I have compensated for the usual errors attendant in use of straight right circular cylindrical elements. It will, of course, be further apparent that in lieu of conical geometrical shapes, spherical shapes could be used as illustrated in FIG. 6.

I claim:

1. In a rotational viscometer, a driven element including a coupling, means for measuring the torque applied to said element, a spindle for mounting in said coupling comprising a shaft of small diameter, a right circular cylindrical section of larger diameter than said shaft fixed concentrically on said shaft, a circular element of the same diameter as said cylinder also fixed concentrically to said shaft, said circular element consisting of two halves each of which is geometrically equivalent to one of the ends of said cylinder.

2. In a rotational viscometer, a driven element including a coupling, means for measuring the torque applied to said element, a spindle for mounting in said coupling comprising a right circular cylindrical section, a shaft, a first transitional section connecting one end of said cylinder with said shaft in a concentric manner, a circular element of the same diameter as said cylinder, a second shaft connecting a second transitional section of said cylinder with said circular element, said circular element having two halves each of which is the geometric equivalent of one of said sections of said cylinder.

3. In a rotational viscometer as in claim 2 wherein said sections are cone-shaped.

4. In a rotational viscometer as in claim 2 wherein said circular element is a disk.

5. In a rotational viscometer, a driven element including a coupling, means for measuring the torque applied to said element, a spindle for mounting in said coupling comprising a right circular cylindrical section with a lower end, a shaft, a section connecting the upper end of said cylindrical section with said shaft, a circular element fixed concentrically to said shaft, said circular element consisting of two halves, one of which halves is geometrically equivalent to said lower end, the other of which halves is geometrically equivalent to said section.

6. In a rotational viscometer as in claim 3 wherein said lower end and said section are cone-shaped.

7. In a rotational viscometer as in claim 3 wherein said circular element is a disk.

8. In a rotational viscometer as in claim 3, wherein a first mark is placed on said shaft between said circular element and said cylindrical section, a second mark is placed on said shaft on the other side of said element, so that the distance from said first mark to said section is equivalent to the sum of the distance from said first mark to said element plus the distance from said element to said second mark.

No references cited.